Patented Sept. 10, 1940

2,214,667

UNITED STATES PATENT OFFICE 2,214,667

COATING COMPOSITION

George Raymond Ensminger, New Brunswick, N. J., assignor to E. I. du Pont de Nemours & Company, Wilmington, Del., a corporation of Delaware No Drawing. Continuation of application Serial No. 65,924, February 26, 1936. This application July 12, 1939, Serial No. 284,093

8 Claims. (Cl. 260—16)

This invention relates to new and useful compositions of matter, and more particularly to improved cellulose derivative coating compositions.

This application is a continuation of my application Serial Number 65,924 filed February 26, 1936.

Conventional cellulose nitrate enamels, especially those containing substantial quantities of white and/or blue pigments, commonly used in the finishing industry, and more particularly for the finishing of automobiles where they are exposed to deteriorating atmospheric conditions, are characterized by very undesirable "chalking" and/or "bronzing" effects, which rapidly destroy the original beauty and life of the finish. Enamels containing appreciable quantities of the more commonly used white pigments, such as zinc oxide, titanium oxide, etc., have an inherent tendency to chalk on exposure to the weather. A finish which chalks badly seldom meets the requirements for durability. In addition, a dull, lifeless appearance is presented and the finish can only be restored to its original condition by repeated washing and polishing. Since in recent years the trend has been toward lighter and brighter colors, it is particularly desirable that compositions utilized commercially be improved in this respect. "Bronzing" is frequently encountered in blue finishes which contain preponderant quantities of iron blue pigments, and is sometimes also observed in finishes which contain green, maroon or red pigments. The effect is one of a gradual development of a metallic sheen, bronze-like in character, which adversely affects the true color, gloss and life of the original finish.

Considerable investigational work has been done in attempting to eliminate these defects. Some success has been attained in reducing chalking tendencies by the use of certain white pigments which inherently chalk less than others, but the improvements resulting from such substitutions have not been all that have been desired. The cause and cure for "bronzing" tendencies have been rather more difficult of solution, since considerable variance in results are noticeable even when extra precautions are taken to insure uniformity in controllable factors during manufacture of the pigment.

This invention has as an object the provision of improved cellulose derivative coating compositions, and more particularly to cellulose nitrate compositions which are characterized by good stability during storage and by satisfactory working properties, and which when applied to surfaces exposed to atmospheric conditions afford desirable improvements with respect to resistance to chalking and bronzing of the finish. A further object is the provision of a cellulose ester composition which affords greater durability for finishes when subjected to outdoor exposure. A still further object is the provision of a cellulose ester composition which is capable of producing a finish that will more effectively retain its original gloss and brilliancy of color during the life of the finish. Other objects will become apparent as the description of the invention proceeds.

These objects are accomplished by means of a composition comprising definite proportions of a cellulose nitrate and certain specific oil modified polyhydric alcohol-polybasic acid resins in conjunction with pigments which normally tend to chalk or bronze.

The following examples, in which the indicated quantities of the ingredients are in percent by weight, are illustrative of the method used in carrying out my invention:

EXAMPLE I.—White enamel

| | Percent |
|---|---|
| Cellulose nitrate (viscosity ½ sec.) | 15.35 |
| Alcohol (denatured) | 14.36 |
| Leaded zinc oxide | 11.25 |
| Isobutyl acetate | 4.37 |
| Ethyl acetate | 18.68 |
| Isobutyl alcohol | 3.39 |
| Toluol | 8.10 |
| High solvency petroleum hydrocarbon | 4.55 |
| Castor oil | 1.84 |
| Dibutyl phthalate | 2.76 |
| Synthetic resin solution | 15.35 |
| | 100.00 |

The resin solution of the above example consists of a mixture of 30 parts of toluol and 70 parts of a synthetic resin which is a reaction product of:

| | Percent |
|---|---|
| Glycerine | 16.2 |
| Phthalic anhydride | 36.6 |
| Coconut oil | 47.2 |
| | 100.0 |

This resin is prepared by first heating the glycerine and coconut oil at temperatures between 380° and 400° F. until a homogeneous solution is secured. The phthalic anhydride is then added and heating continued at about 480° F. until an acid number of about 5—6 is obtained. It is desirable also to blanket the charge with an inert gas during the preparation of the resin.

The above mentioned enamel composition, which contains cellulose nitrate, resin and plasticizer in the ratio of 10 parts by weight of cellulose nitrate, 7 parts by weight of resin, and 3 parts by weight of plasticizer, is prepared by first dispersing the pigment in a cellulose nitrate colloid of suitable consistency adjusted by the addition of suitable solvents and diluents, in such proportions as to permit working the mass in a kneading machine, a process described in detail in Patent 2,052,470. This pigmented intermediate is then placed in an agitator mixer together with the remaining ingredients, including the synthetic resin solution, in the proportions indicated, and the mixture thoroughly agitated until a homogeneous enamel product is obtained.

EXAMPLE II.—*Blue enamel*

| | Per cent |
|---|---|
| Chinese blue pigment | 7.00 |
| Zinc oxide | .80 |
| Synthetic resin solution | 10.75 |
| Cellulose nitrate | 15.00 |
| Ethyl acetate | 22.01 |
| Ethyl alcohol (denatured) | 12.60 |
| Isobutyl alcohol | 4.62 |
| Naphtha | 11.07 |
| Isobutyl acetate | 4.10 |
| Toluol | 3.30 |
| Dibutyl phthalate | 5.00 |
| Castor oil | 3.30 |
| Citric acid | .45 |
| | 100.00 |

The synthetic resin of the above example and its preparation are the same as described under Example I.

The above enamel contains cellulose nitrate, resin and plasticizer in the ratio of 10 parts of cellulose nitrate, 5 parts of the resin, and 5.5 parts of plasticizer, and is prepared by the method described for Example I, which involves dispersion of the pigment in the nitrocellulose portion of the composition by suitable kneading action. Other methods of dispersing the pigment in the vehicle, such as by grinding in ball mills, roller mills, buhrstone mills, etc. may also be utilized if desired.

The previously disclosed compositions comprising cellulose nitrate and non-drying oil modified polyhydric alcohol-polybasic acid resins are ineffective as a means for obtaining the requisite working properties and stability in storage in conjunction with the improved resistance to chalking described herein. It is therefore essential to the success of the present compositions that the requirements described herein be observed as to the properties of the oil modified resin vehicle, and as to the relative amounts of resin and nitrocellulose present in the composition.

The resin should be modified with from not less than 35% to not more than 60%, and preferably with from 40% to 50% of coconut oil or similar non-hydroxy non-drying oils such as cottonseed oil, or with the blown oils of these types. Compositions of the present kind containing resins modified with hydroxy oils, such as castor oil, are not suitable for the purposes of the present invention because of the poor durability of the cellulose nitrate composition and because such resins react with reactive type pigments. The oil modified resins used in this invention may be made by simultaneous heat treatment of the glycerol, phthalic anhydride and acids derived by hydrolysis from the non-hydroxy non-drying oil, or they may be made by the method referred to in the examples which consists in reacting the phthalic anhydride with the product obtained by separately heating the oil and glycerol. It is to be observed that although some improvement in chalking tendencies can be obtained with resins modified with non-drying oil outside the mentioned limits it is necessary to observe those limits in order to obtain my improved composition having acceptable working properties combined with maximum resistance to chalking or bronzing. If the non-drying oil modifier is reduced much below 35% the resulting composition is entirely too thermoplastic, and if extended above 60% the film upon exposure exhibits excessive dulling which may be the result of exudation of the oil.

The resin must also be prepared so that the acid number is kept as low as possible, preferably not more than 5 or 6, and in any event not permitted to rise above 10. Resins of higher acid number cannot be used with reactive type pigments such as zinc oxide because of poor stability of the compositions during storage as evidenced by the formation of grit. Such reactive type pigments as referred to in the trade indicate pigments which chemically react with the liquid or solid ingredients in the composition into which they are incorporated.

It is also necessary in order to obtain maximum chalk resistance with acceptable working properties that the cellulose nitrate-alkyd resin-plasticizer ratios be kept within definite limits. These ratios should be such that for each 10 parts by weight of nitrocellulose the amount of the resin is kept below 10 parts but not less than about 5 parts. If the ratio of resin to nitrocellulose is increased by a small amount, as for instance to 1 part resin for 1 part nitrocellulose, the compositions are practically of no value for the present purpose because the sanding, rubbing, and polishing operations carried out in the automotive industry cannot be satisfactorily practiced. The amount of plasticizer is about 1 part when the maximum quantity of resin is used and is about 5 parts when the minimum amount of resin is used. If the resin ratio is reduced below the limit given, the degree of improvement in chalk resistance is not of commercial significance. In general, the amount of resin required for correcting bronzing tendencies is less than the amount required to provide chalk resistance in compositions containing chalking type pigments.

The types and proportions of solvents and diluents shown in the above examples may be varied over a considerable range and the substitution of an equivalent material or a change in proportions to suit conditions of application or other special requirements is considered within the ordinary practice of one skilled in the art. The plasticizers may include one or more of the usual materials such as tricresyl phosphate, dibutyl tartrate, dicyclohexyl phthalate, dimethyl cellosolve phthalate, diethyl phthalate, etc.

Cellulose nitrate of low viscosity characteristic is preferred as indicated in the examples, but the use of commercially available cellulose nitrates of higher viscosity characteristics is in no wise precluded, since the several advantages hereinafter described likewise accrue.

In Example I the use of leaded zinc oxide as the pigment ingredient is indicated. It is to be observed, however, that the improved chalk resistant properties of the composition described herein are not dependent, as in prior used compositions, on the use of certain selected pigments. It has been found that the compositions of this invention likewise inhibit chalking of other white pigments, such as zinc oxide, antimony oxide, titanium oxide, either free or extended with barium sulfate or calcium sulfate in the ratios of 1:3 and 3:7, respectively, and titanate pigments such as barium, zinc, and lead titanates. Therefore the new compositions may be used to advantage as vehicles for these pigments or combinations of two or more white pigments or in enamel products where the white pigment predominates, but where colored pigments are also present to afford the so-called pastel shades, which are frequently characterized by excessive chalking in previously utilized cellulose nitrate vehicles.

The compositions described herein are also particularly effective in reducing bronzing tendencies of iron blue pigments, such as Chinese, Prussian and Milori blues as illustrated in Example II. The small proportion of zinc oxide shown in this example is included to assist in developing the desired color, an improvement disclosed and claimed in application Serial No. 656,153. Other pigments may be used in conjunction with the blue pigment, although conventional methods usually provide for the manufacture of single pigment enamels, from which any desired color may be developed by proper mixing of these so-called "tinting solutions."

Although phthalic anhydride is the preferred acid radical in the resin ingredient of the improved compositions, certain other acids such as succinic, malic, adipic, etc. may be satisfactorily substituted wholly or in part for the phthalic anhydride, although best results are secured when phthalic anhydride is present in preponderant quantities in these mixtures.

Suitable resins for the new compositions may also be prepared using other polyhydric alcohols such as diethylene glycol, trimethylene glycol, sorbitol, diglycerol, etc.

The invention is not only applicable to correcting bronzing tendencies in enamels prepared from iron blue pigments where such tendency is generally of greater degree, but it is also operative in eliminating this defect in enamels prepared from other pigments which exhibit this tendency, such as certain red, maroon and green pigments.

The compositions are generally useful in coating and finishing surfaces which are to be exposed to the destructive forces of the elements. They are of particular merit in finishing automobiles where unusually destructive climatic conditions are frequently encountered and where conventional enamels widely used in this industry fail in a relatively short time.

The compositions of this invention have in use shown several important advantages. In the first place chalking and bronzing tendencies, defects which generally characterized previously available enamels designed for outdoor exposure, are eliminated or greatly reduced.

The original gloss or luster of finishes produced from the compositions of this invention, as compared to those previously used for the same purpose, is retained over a greater period, as are also the brilliancy and true color of the finish as originally applied. Then, also, the general durability and life of the finish are increased, thus affording obvious economies for the consumer. Furthermore, no changes in production operations are required since sanding, rubbing and polishing of the finish are accomplished in the same manner and with the expenditure of no more time and effort than formerly required for finishes produced from the conventional type enamels. The highly satisfactory working properties of my improved compositions are also noteworthy inasmuch as the known compositions containing similar ingredients are mostly so deficient in working properties as to make them entirely unsuited to the present purpose.

As many apparently widely different embodiments of this invention may be made without departing from the spirit and scope thereof, it is to be understood that I do not limit myself to the specific embodiments thereof except as defined in the appended claims.

I claim:

1. A coating composition highly resistant to chalking or bronzing comprising a pigment normally subject to chalking or bronzing in the film, cellulose nitrate, a plasticizer, and a polyhydric alcohol-polybasic acid resin modified with 35% to 60% non-hydroxy non-drying oil, said resin having an acid number less than 10 and being present in said composition in a ratio of an amount by weight of at least about 5 parts as a minimum but less than about 10 parts as a maximum for each 10 parts of cellulose nitrate, said plasticizer being present in a ratio of an amount of about 1 part by weight as a minimum and 5 parts by weight as a maximum.

2. The coating composition set forth in claim 1 in which said non-drying oil is one of the class consisting of coconut oil and cottonseed oil.

3. The coating composition set forth in claim 1 in which said resin is glyceryl phthalate resin having an acid number of not more than 6 and modified with from 40% to 50% coconut oil.

4. The coating composition set forth in claim 1 in which said plasticizer is dibutyl phthalate and in which said resin is glyceryl phthalate resin having an acid number of not more than 6 modified with from 40% to 50% coconut oil.

5. The coating composition set forth in claim 1 in which said resin is glyceryl phthalate resin having an acid number of not more than 6 and modified with from 40% to 50% cottonseed oil.

6. The coating composition set forth in claim 1 in which said plasticizer is dibutyl phthalate and in which said resin is glyceryl phthalate resin having an acid number of not more than 6 and modified with from 40% to 50% cottonseed oil.

7. The coating composition set forth in claim 1 in which said resin comprises the reaction product of phthalic anhydride and diethylene glycol.

8. The coating composition set forth in claim 1 in which said resin comprises the reaction product of phthalic anhydride and trimethylene glycol.

GEORGE R. ENSMINGER.